United States Patent [19]

Numazawa et al.

[11] 4,055,237
[45] Oct. 25, 1977

[54] DISC BRAKE FOR A VEHICLE

[75] Inventors: Akio Numazawa, Nagoya; Hiroyuki Nakamura, Toyota; Tokio Kurita, Toyota; Kouji Horie, Toyota; Toshio Kondo, Chiryu, all of Japan

[73] Assignees: Aishin Seiki Kabushiki Kaisha; Toyota Jidosha Kogyo Kabushiki Kaisha, both of Japan

[21] Appl. No.: 762,343

[22] Filed: Jan. 25, 1977

[30] Foreign Application Priority Data

Jan. 27, 1976   Japan .................. 51-7818

[51] Int. Cl.² ........................... F16D 55/228
[52] U.S. Cl. ...................... 188/73.4; 188/73.5
[58] Field of Search ............... 188/72.5, 73.3, 73.4, 188/73.5, 205 A

[56] References Cited

U.S. PATENT DOCUMENTS

| 464,220 | 12/1891 | Stephenson | 188/205 A |
|---|---|---|---|
| 602,989 | 4/1898 | Kersey et al. | 188/205 A |

FOREIGN PATENT DOCUMENTS

| 2,106,948 | 9/1971 | Germany | 188/72.5 |
|---|---|---|---|
| 2,207,163 | 8/1973 | Germany | 188/73.4 |
| 1,257,026 | 12/1971 | United Kingdom | 188/73.4 |

*Primary Examiner*—Trygve M. Blix
*Assistant Examiner*—Edward R. Kazenske
*Attorney, Agent, or Firm*—Stevens, Davis, Miller & Mosher

[57] ABSTRACT

Disclosed is a disc brake for a vehicle comprising a hydraulic mechanism, a pair of friction pads disposed to face, respectively, both working surfaces of a brake disk to be rotated integrally with a wheel axis of the vehicle, a loosely fitted annular caliper plate disposed around the hydraulic mechanism and the friction pads and a pair of torque receiving arms arranged between the pads along the direction parallel to the wheel axis. A bridge member is spanned between free ends of the arms. An anti-rattle spring is disposed between the bridging member and the caliper plate.

3 Claims, 16 Drawing Figures

DISC BRAKE FOR A VEHICLE

FIELD OF THE INVENTION

The present invention relates to a disc brake device of the so-called floating caliper type.

BACKGROUND OF THE INVENTION

A disc brake device of floating caliper type has been widely used due to the fact that the manufacturing cost of this type of brake is low. This is because only one cylinder, the cost of which is relatively high compared to the other parts of the device, is necessary in this floating caliper type. In a brake of this type, in order to facilitate the movement of the caliper plate, it is necessary that the caliper plate be loosely fitted to the other parts of the brake device. Therefore, a means is necessary for preventing the rattling of the caliper plate when the brake device is not operated while the vehicle is moving.

In a known floating caliper type disc brake, two anti-rattle springs are arranged between a pair of torque receiving arms which are arranged along a direction parallel to the wheel axis for receiving brake torque during engine braking operations. In this known device, if the cylinder diameter is increased to enhance braking power, the size of the caliper must be enlarged and, as a result, it becomes impossible to utilize the limited space of the vehicle effectively. Moreover, the assembling of the anti-rattle springs is difficult and cannot be performed with high efficiency. Still further, since the number of the parts is increased the manufacturing cost is increased.

SUMMARY OF THE INVENTION

An object of the present invention is to provide a disc brake device for a vehicle in which the foregoing defects and disadvantages involved in the known techniques are eliminated.

Another object of the present invention is to provide a disc brake device for a vehicle of floating caliper type in which only a single anti-rattle spring is used.

Still another object of the present invention is to provide a disc brake device in which the number of parts in the device is decreased.

A further object of the invention is to provide a disc brake device, in which the size of the caliper plate is small but which has sufficient braking power.

According to the present invention a disc brake for a vehicle is provided, which comprises:
a stationary member integral with a body of the vehicle;
a first and a second friction pad of plate like shape parallely arranged along a first direction transverse to a wheel axis, each pad being movably mounted to the stationary member in a second direction parallel to the wheel axis;
a brake disc having a first and a second working surface parallely arranged along said first direction, said brake disc being secured to said wheel axis so that the disc rotates in accordance with the rotation of the wheel axis, and said brake disc being arranged between said first and second friction pads so that the first working surface faces the first pad while the second working surface faces the second pad;
a caliper plate loosely fitted to the stationary member so that it is positioned to be parallel to said second direction, which plate is movably arranged around the friction pads and has a first and a second inner end facing each other in said second direction, said first inner end being situated adjacent to said first friction pad;
a hydraulic mechanism arranged in the stationary member so that it is located between said second friction pad and said second inner end of the caliper plate, which hydraulic mechanism is capable of co-operating with said second friction pad to move said second pad toward said second working surface of the brake disc in said second direction so that said second pad touches said second working surface and in capable of co-operating with said second inner end of the caliper plate to move the caliper plate away from said second friction pad in said second direction so that said first pad touches said first working surface of the brake disk;
a pair of spaced apart arms formed integral with the stationary member in cantilever fashion along said second direction so that the first and the second friction pads are situated between said arms, the arms operating to receive brake torque generated between the friction pads and the brake disk in a circumferential direction of the disk when said hydraulic mechanism is operated to brake the vehicle;
a bridge member arranged between free ends of said arms, and;
resilient means disposed between said bridge member and said caliper plate so that they are resiliently separated from each other in one direction transverse to the caliper plate and so that the caliper plate is resiliently held against the movement of the caliper plate in another direction parallel to the caliper plate. Thus, the rattle of the caliper plate while the vehicle is moving is prevented.

DESCRIPTION OF THE PREFERRED EMBODIMENT

Figure 1:
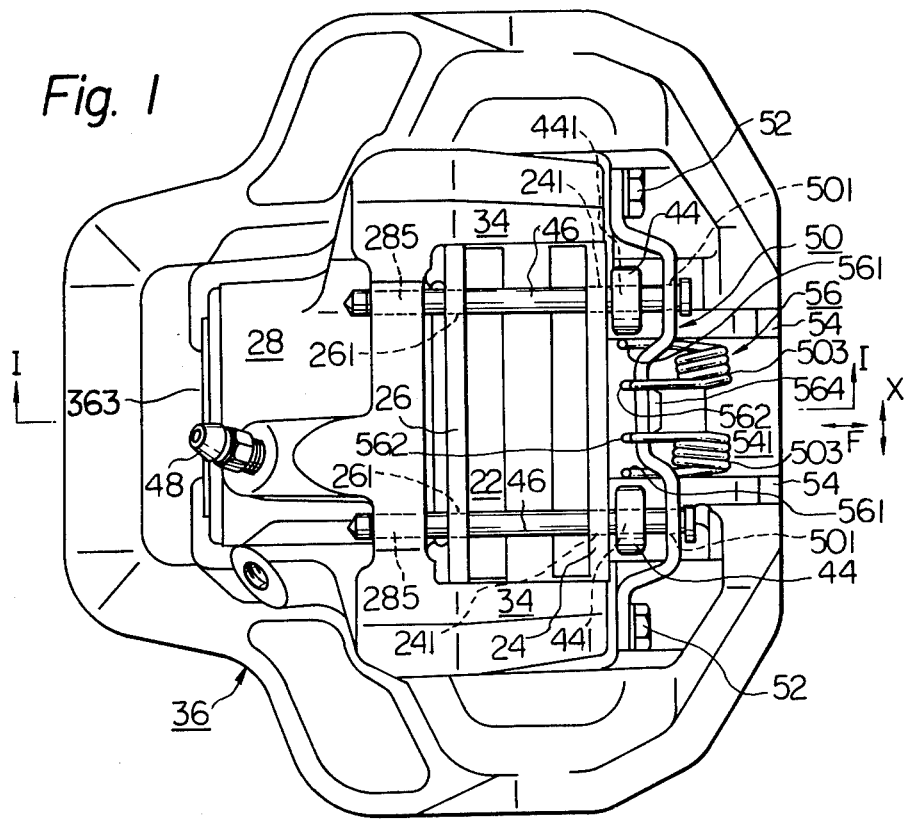
FIG. 1 is a plan view showing an embodiment of the disc brake of a floating caliper type of the present invention.

In FIGS. 1 through 5 showing a floating caliper type disc brake for a vehicle, numeral 16 indicates a brake disk 16 secured to a wheel axis 18 of the vehicle. The disk 16 has working surfaces 161 and 163 parallely extending along a direction X transverse to the direction F of the wheel axis 18. Friction pads 20 and 22 of plate shape are parallely arranged along the direction X so that the pad 20 faces the working surface 161 and the pad 22 faces the working surface 163. When the disc brake is not operated small clearances are formed between the pad 20 and the surface 161 and between the pad 22 and the surface 163. The pads 20 and 24 have, on their sides remote from the disk 16, backing members 24 and 26, respectively.

Numeral 28 represents a cylinder having bracket portions 281 secured to a vehicle body B (FIG. 5) by bolts 282 (only one is shown). In the cylinder 28, a bore 283 (FIG. 2) is formed along the direction F parallel to the wheel axis 18. Pistons 30 and 32 are slidably accomodated in the cylinder bore 283. A pair of parallely spaced apart brake torque receiving arms 34, integrally formed with the cylinder 28 in a cantilever fashion, extend along the direction F of the wheel axis 18, so that the friction pads 20 and 22 are situated between the arms 34.

A caliper plate 36, of substantially annular shape positioned so as to be parallel to the direction F of wheel axis 18, is arranged around the cylinder 28 and the pads 20 and 22. The caliper plate 36 has inner ends 361 (FIG. 5) and 363 (FIG. 1) facing each other in the direction F of the wheel axis 18. The inner end 363, as shown in FIG. 1, is fitted to a recess 331 (FIG. 2) formed on the outside of the piston 32 by means of resilient members 38, 40 and 42 (FIG. 3). Therefore, the caliper plate 36 is loosely supported on the cylinder 28.

On the caliper plate 36 near the pad 20, a pair of spaced apart brakets 44 (FIG. 5) are formed. A pair of spaced apart pins 46 extending parallel to the direction F of the wheel axis 18 are, on one of their ends, fixably inserted to respective holes 285 (FIG. 1) formed in the cylinder 28, and are loosely inserted into respective holes 441 formed in the brackets 44. Holes 241 (FIG. 1) are formed on the backing member 24 above the pad 20, whereas holes 261 are formed on the backing member 26 above the pad 22. The intermediate portions of each of the pins 46 passes freely through the holes 241 and 261, so that the movement of the pads 20 and 22 is restricted by the pins 46 so as to be parallel to the vehicle axis 18.

Figure 2:
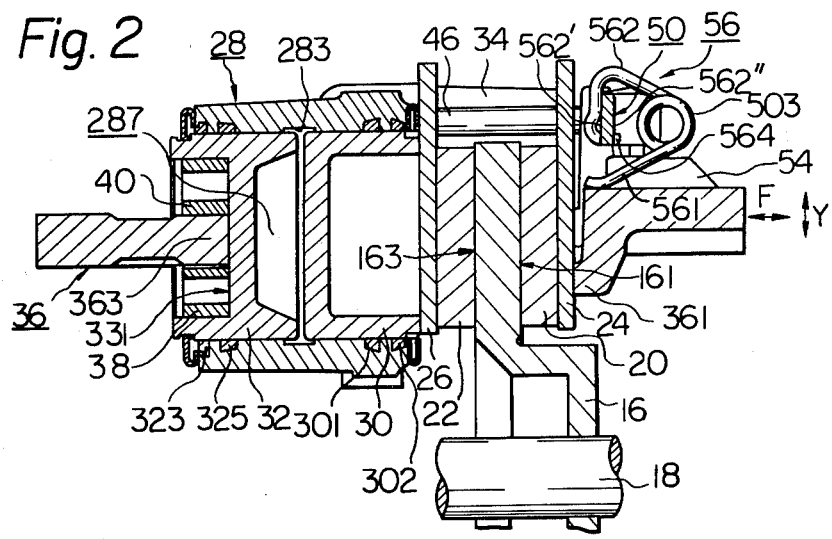
FIG. 2 is a view showing the section along the line I—I in FIG. 1.
Figure 3:
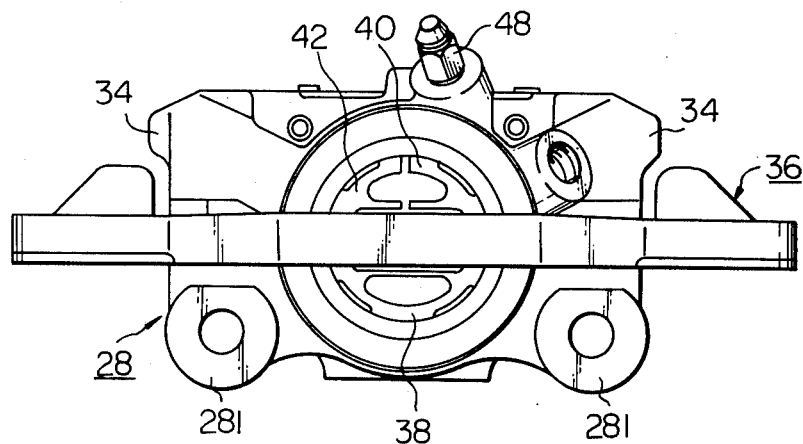
FIG. 3 is a front view of the disc brake in FIG. 1.
Figure 4:
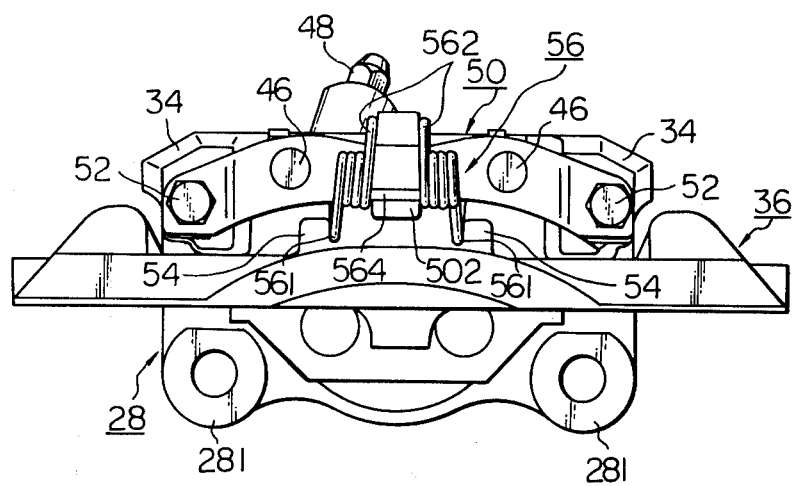
FIG. 4 is a back view of the brake in FIG. 1.

The backing member 24 of the pad 20 faces the inner end 361 (FIG. 5) of the caliper plate 36, whereas the backing member 26 of the pad 22 faces the piston 30 (FIG. 2).

The piston 30 is, on the cylindrical surface thereof, connected to the cylinder bore 283 of the cylinder 28 by resilient seal members of ring shape 301 and 302. The piston 32 is, on the cylindrical surface thereof, connected to the cylinder bore 283 by resilient seal members of ring shape 323 and 325. An inlet port 48 for brake oil is formed on the cylinder 28, which port 48 communicates with a space 287 formed between the pistons 30 and 32 in the cylinder bore 283. The inlet port 48 is connected to a not shown master cylinder. Therefore, when the brake oil is introduced into the space 287 from the master cylinder to brake the vehicle the piston 30 is moved toward the pad 22, whereas the piston 32 is moved in the opposite direction when the braking operation is cancelled because the brake oil in the space 287 is returned to the master cylinder via a not shown outlet port communicating with the space 287. The resilient seal members 301 and 302 cause the piston 30 to return to its original position, whereas the resilient seal members 323 and 325 cause the piston 32 to return to its original position.

Figure 6:
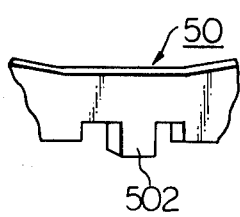
FIG. 6 is a perspective view illustrating a part of a bridging member in the brake.

According to the present invention, a bridging member 50 is arranged between the free ends of the torque receiving arms 34. A pair of bolts 52 secure both ends of the bridging member 50 to the respective free ends of the arms 34. The member 50 has a pair of holes 501, through which the respective pins 46 slidably pass. A torque portion 502 (FIGS. 1 and 6) is formed on the middle portion of the bridge member 50 so that the portion 502 faces the caliper plate 36. On the surface of caliper plate 36 facing the torque portion 502, a pair of spaced apart guide projections 54 are formed along the direction F parallel to the wheel axis 18.

Figure 7:
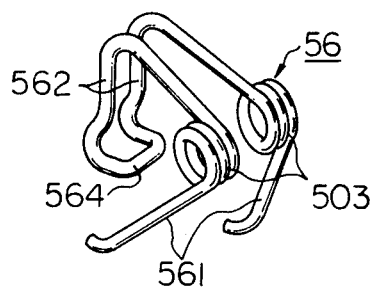
FIG. 7 is a perspective view illustrating an anti-rattle spring in the brake.
Figure 8:
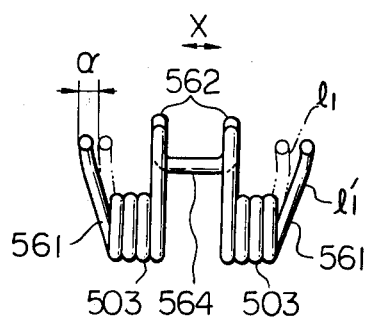
FIG. 8 is a plan view of the spring in FIG. 7.

Numeral 56 indicates an anti-rattle spring according to the invention arranged between the bridge member 50 and the caliper plate 36. The anti-rattle spring 56, as shown in FIG. 7, has a pair of leg portions 561, a pair of middle portions 562 of hook shape, a pair of coil portions 503 located between the legs portions 561 and middle portions 562, and a loop portion 564 connecting the hook portions 562 with each other. The leg portions 561 of the spring 56 are fitted to a guide passageway 541 (FIG. 1) formed between the guide projections 54 in such a manner that each leg portion 561 abuts against a side wall of the corresponding guide projection 54. The solid line $l_1'$ illustrates the free state of the spring 56 before assembling. After the spring 56 is assembled as shown in FIG. 1, an elastic deformation $\alpha$ of each leg portion 561 occurs, as shown by the broken line $l_1'$ in FIG. 8, in the direction X parallel to the plane of the caliper plate and transverse to the wheel axis.

Figure 5:
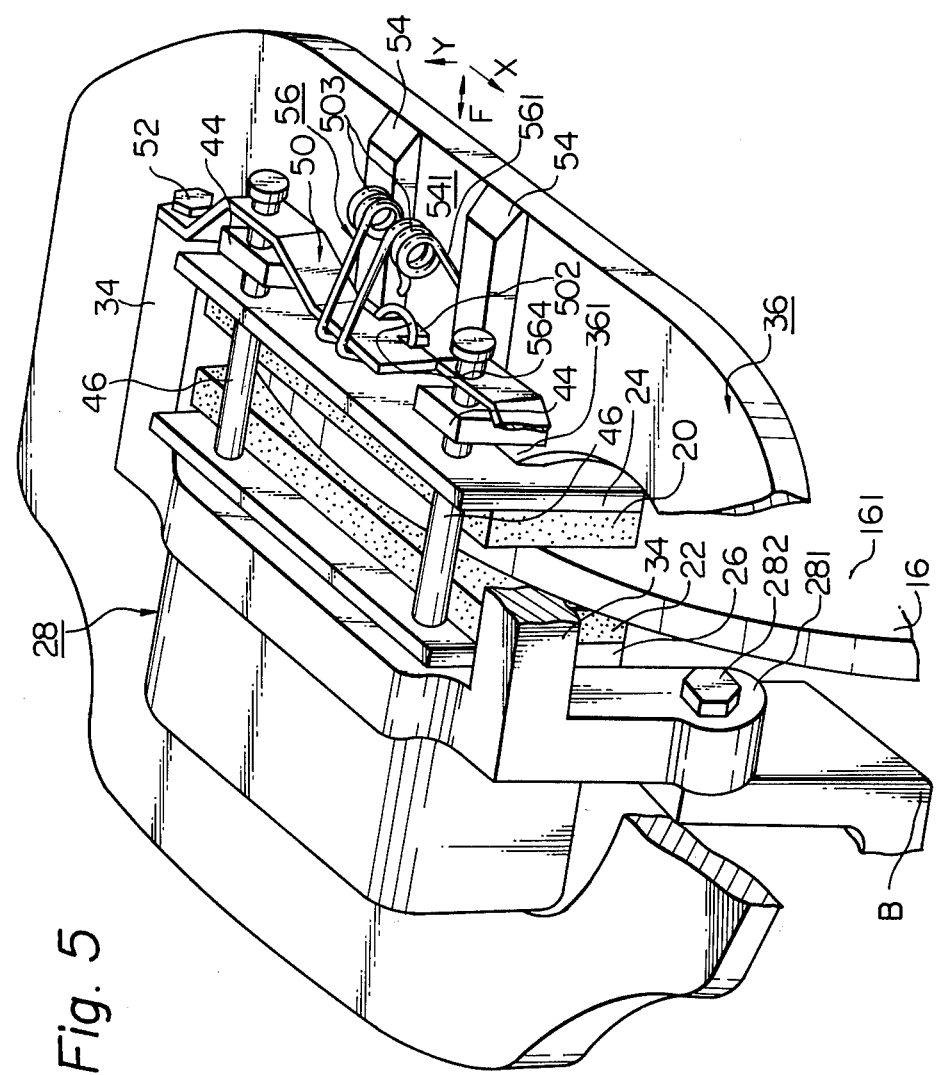
FIG. 5 is a schematical perspective view of the brake in FIGS. 1 through 4.
Figure 9:
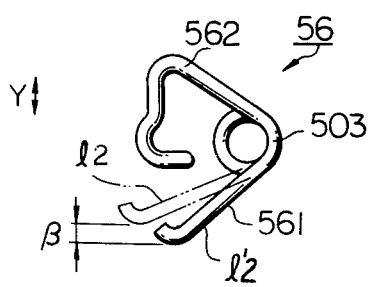
FIG. 9 is a side view of the spring in FIG. 7.

Each middle portion 562 of the spring 56, as shown in FIG. 2, abuts against the bridge member 50 on one side 562' thereof near the backing member 20. The loop portion 564 engages the torque portion 502 of the bridge member 50 as shown in FIG. 5, in such a manner that the loop portion 564 abuts against the bridge member 50 on the side 562" thereof opposite to the side 562' as shown in FIG. 2. In FIG. 9, the solid line $l_2'$ illustrate the free state of the spring 56 before assembling. After the spring 56 is assembled as shown in FIG. 2, an elastic deformation $\beta$ of the leg portions 561 occurs, as shown by the broken line in FIG. 9, in the direction Y transverse to the plane of the caliper plate 36. The resilient force of the spring 56 can be varied in accordance with the number of turns of the coil portions.

Figure 10A:
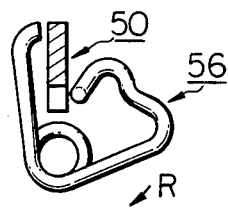
FIGS. 10A through 10E illustrate the assembling of the anti-rattle spring in FIG. 7.
Figure 10B:
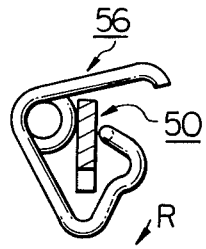
Figure 10C:
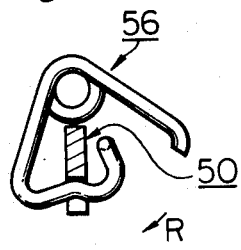
Figure 10D:
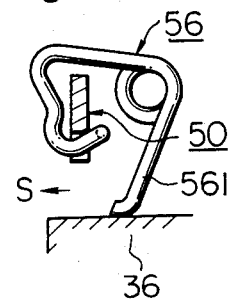
Figure 10E:
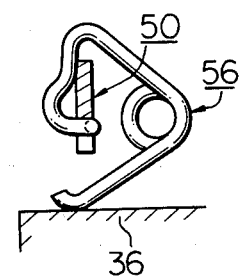

When the anti-rattle spring of the present invention is attached the spring 56 is firstly placed with respect to the bridge member 50 as shown by FIG. 10A. The spring 56 is then turned in the direction R in an order shown in FIGS. 10A, 10B and 10C. Then, as shown in FIG. 10D, when the leg 561 rests on the surface of the caliper plate 36, it is pressed in the direction S against the spring force, whereby the spring 50 is fitted between the bridge member 50 and the caliper plate 36 as shown in FIG. 10E. As will be apparent from the foregoing illustration, the anti-rattle spring of the present invention can easily be assembled.

The operation of the brake device according to the invention will now be described.

When brake oil is introduced into the space 287 in the cylinder 28 for carring out a braking operation, the piston 30 co-operates with the backing member 26 to cause the friction pad 22 to be touched to the working surface 163 (FIG. 2) of the brake disk 16, while the piston 32 co-operates the inner end 363 of the caliper plate 36 so that the inner end 363 is moved away from the cylinder 28 in the direction F. As a result of this movement of the caliper plate 36, the inner end 361 thereof co-operates with the backing 24 to cause the friction pad 20 to be touched with the friction surface 161 of the brake disk 16. A brake force is caused between one of torque receiving arms 34 in accordance with the direction of the rotation of the disk 16 and, thus, the vehicle is stopped. During the braking operation the anti-rattle spring permits the movement of the caliper plates in the direction F, because the leg portions 561 of the spring 56 is slidably fitted into the passageway 541 formed between the guide plates 54.

When the brake oil is removed from the space 387 for cancelling the braking operation, the piston 30 (FIG. 2) is returned to its original position to cause the pad 22 to be detached from the working surface of the disk 16, while the piston 32 is also returned to its original position to cause the inner end 363 of caliper plates 36 to be moved toward the cylinder 28 in the direction F. Thus, the friction pad 20 is detached from the working surface 161 of the disk and the vehicle can be moved. In the use of the anti-rattle spring 56 according to the invention, the caliper plate 36 not easily moved in the direction F of the wheel axis 18 by the shaking or vibration of the brake disk 16 when the brake device is not operated while the vehicle is moving. This is because the elastic force of the leg portions 561 of the spring 56 acts to prevent such a movement.

The anti-rattle spring 56 according to the present invention effectively prevents rattling of the caliper plate 36 when the brake device is not operated while the vehicles is moving, because vibration of the caliper plate 36 in the directions X and Y is prevented while the vehicle is moving. That is to say: (1) the leg portions, 561 of the spring 56 are fitted to the guide passageway 541 with the elastic deformation α, as has already been described with reference to FIGS. 1 and 8, and therefore, the caliper plate 36 is prevented from vibrating in the direction X during the vehicle running, and; (2) the leg portions 561 are pressed to the caliper plate 36 with the elastic deformation β, as has already been described with reference to FIGS. 2 and 9, and therefore, the vibration of the caliper plate 36 in the direction Y during engine running is prevented.

As is clear from the above, rattling of the caliper plate while the vehicle is moving is effectively prevented by a single anti-rattle spring, according to the present invention. Therefore, the number of the parts in the brake device of the present invention is less than in known brake devices and, thus, the manufacturing cost is less. Further the anti-rattle spring according to the invention is located at a position separated from the cylinder 28 and, therefore, the dimensions of the cylinder can be increased without increasing the dimensions of the caliper plate 36. Thus, the limited space in the vehicle body can be effectively used.

Figure 11:
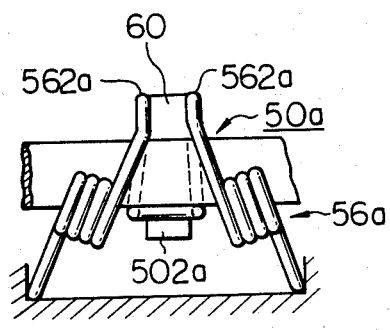
FIGS. 11 and 12 are plan and side views of a modification of the above mentioned embodiment.
Figure 12:
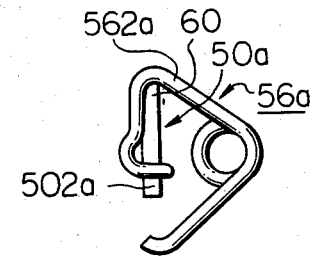

In a modification shown in FIGS. 11 and 12 a bridge member 50a has a projection 60 arranged opposite to a torque portion 502a which is similar to the torgure portion 502 in the embodiment shown in FIGS. 1 through 9. This projection 60 is arranged between a pair of hook portions 562a of an anti-rattle spring 56a which is slightly changed from the spring 56 in the embodiment shown in FIGS. 1 through 9. Because of the projection 60, the position of the spring 50a during use is not easily moved.

While the invention has been described by way of examples, many modifications and changes may be made by those who are skilled in this art without departing from the scope and spirit of the invention.

What is claimed is:

1. A disc brake for a vehicle comprising:

a stationary member integral with a body of the vehicle;

a first and a second friction pad of plate like shape parallely arranged along a first direction transverse to a wheel axis, each pad being movably mounted to said stationary member in a second direction parallel to the wheel axis;

a brake disc having a first and a second working surface parallely arranged along said first direction, said brake disc being secured to said wheel axis so that the disc rotates in accordance with the rotation of the wheel axis, and said brake disk being arranged between said first and second friction pads so that the first working surface faces the first pad while the second working surface faces the second pad;

a caliper plate loosely fitted to the stationary member so that it is positioned to be parallel to said second direction, said caliper plate being arranged around the friction pads and has a first and a second inner end facing each other in said second direction, said first inner end being situated adjacent to said first friction pad;

a hydraulic mechanism arranged in the stationary member so that it is located between said second friction pad and said second inner end of the caliper plate, which hydraulic mechanism is capable of co-operating with said second friction pad to move said second pad toward said second working surface of the brake disc in said second direction so that said second pad touches said second working surface and is capable of co-operating with said second inner end of the caliper plate to move the caliper plate away from said second friction pad in said second direction so that said first pad touches said first working surface of the brake disc;

a pair of spaced apart arms formed integral with the stationary member in cantilever fashion along said second direction so that the first and the second friction pads are situated between said arms, the arms operating to receive brake torque generated between the friction pads and the brake disc in a circumferential direction of the disc when said hydraulic mechanism is operated to brake the vehicle;

a bridge member arranged between free ends of said arms, and;

resilient means disposed between said bridge member and said caliper plate so that they are resiliently separated from each other in one direction transverse to the caliper plate and so that the caliper plate is resiliently held against movement thereof in another direction parallel to the caliper plate, whereby rattling of the caliper plate, due to said loose fitting of the caliper plate to the stationary member, is prevented while the vehicle is moving.

2. A disc brake for a vehicle according to claim 1, wherein said resilient means comprises:

a torque portion formed on the bridge member so that it faces the caliper plate;

a pair of spaced apart guide projections formed on the surface of the caliper plate in said second direction parallel to the wheel axis, and;

a spring means comprising: a loop portion which engages with said torque portion so that the loop portion abuts against the torque portion on one side of the bridge member remote from said friction pads; a pair of middle portions each having one end connected to said loop portion so that each middle portion abuts against the bridge member on the other side of the bridge member near said friction pads, and; a pair of leg portions each having one end connected to the other ends of said midddle portions, which leg portions are slidably fitted to a passageway formed between said guide projections, so that the leg portions are elastically flexed toward each other in said other direction parallel to the caliper plate to prevent the vibration of caliper plate in said other direction while the vehicle is moving, and so that the leg portions are elastically flexed with respect to the respective middle portions in said one direction transverse to the caliper plate so that the vibration of the caliper plate in said one direction is prevented while the vehicle is moving.

3. A disc brake device for a vehicle according to claim 2, wherein a coil portion is formed between said each leg portion and the corresponding middle portion.

* * * * *